US011310572B2

(12) United States Patent
Juneja et al.

(10) Patent No.: US 11,310,572 B2
(45) Date of Patent: Apr. 19, 2022

(54) MULTI LAYER PROTECTION CONTROL FOR COHERENT DWDM NETWORKS

(71) Applicant: Infinera Corp., Annapolis Junction, MD (US)

(72) Inventors: Kapil Juneja, Karnataka (IN); Amit Satbhaiya, Whitefield (IN); Rajan Rao, Fremont, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/126,403

(22) Filed: Dec. 18, 2020

(65) Prior Publication Data

US 2022/0021955 A1 Jan. 20, 2022

Related U.S. Application Data

(60) Provisional application No. 63/051,988, filed on Jul. 15, 2020.

(51) Int. Cl.
*H04Q 11/00* (2006.01)
*H04B 10/032* (2013.01)
*H04J 14/02* (2006.01)

(52) U.S. Cl.
CPC ....... *H04Q 11/0062* (2013.01); *H04B 10/032* (2013.01); *H04J 14/0227* (2013.01); *H04J 14/0283* (2013.01)

(58) Field of Classification Search
CPC ............... H04Q 11/0062; H04B 10/032; H04J 14/0227; H04J 14/0283
See application file for complete search history.

(56) References Cited

U.S. PATENT DOCUMENTS

| 7,532,817 | B1* | 5/2009 | Ko | H04B 10/032 398/20 |
| 2014/0146663 | A1* | 5/2014 | Rao | H04L 45/28 370/228 |
| 2015/0244470 | A1* | 8/2015 | Chhillar | H04B 10/70 398/5 |
| 2016/0164596 | A1* | 6/2016 | Rao | H04J 14/0291 398/5 |
| 2017/0201323 | A1* | 7/2017 | Prakash | H04Q 11/0001 |
| 2017/0295090 | A1* | 10/2017 | Gopalan | H04L 45/22 |
| 2017/0338887 | A1* | 11/2017 | Rao | H04B 10/07955 |
| 2018/0302152 | A1* | 10/2018 | Shikhmanter | H04L 43/0882 |

(Continued)

*Primary Examiner* — Mina M Shalaby
(74) *Attorney, Agent, or Firm* — David Soltz

(57) ABSTRACT

A terminal node, an optical network and/or a method are described in which a first processor of a first optical protection switching module having a first optical switch, and a second processor of a second optical protection switching module having a second optical switch coordinate switching of the first optical switch and the second optical switch upon detection of a first failure by the first processor, or the detection of a second failure by the second processor. The first processor monitors optical signals received by a first line port to determine a first failure in a first working path at a first layer (e.g., physical layer) within an optical communication model. The second processor monitors the optical signals received by another line port to determine a second failure in the first working path at a second layer (e.g., optical layer) within the optical communication model.

19 Claims, 10 Drawing Sheets

(56) References Cited

U.S. PATENT DOCUMENTS

| | | | |
|---|---|---|---|
| 2018/0351694 A1* | 12/2018 | Rao | H04L 1/0054 |
| 2019/0007131 A1* | 1/2019 | Satyarthi | G06F 3/0679 |
| 2019/0109638 A1* | 4/2019 | Yilmaz | H04B 10/27 |
| 2019/0215059 A1* | 7/2019 | Johansson | H04Q 11/0062 |
| 2020/0059712 A1* | 2/2020 | Satyarthi | H04J 14/0212 |
| 2020/0112365 A1* | 4/2020 | Satbhaiya | H04J 14/0287 |
| 2020/0382209 A1* | 12/2020 | Hou | H04J 3/14 |
| 2021/0226697 A1* | 7/2021 | Rao | H04B 10/032 |

* cited by examiner

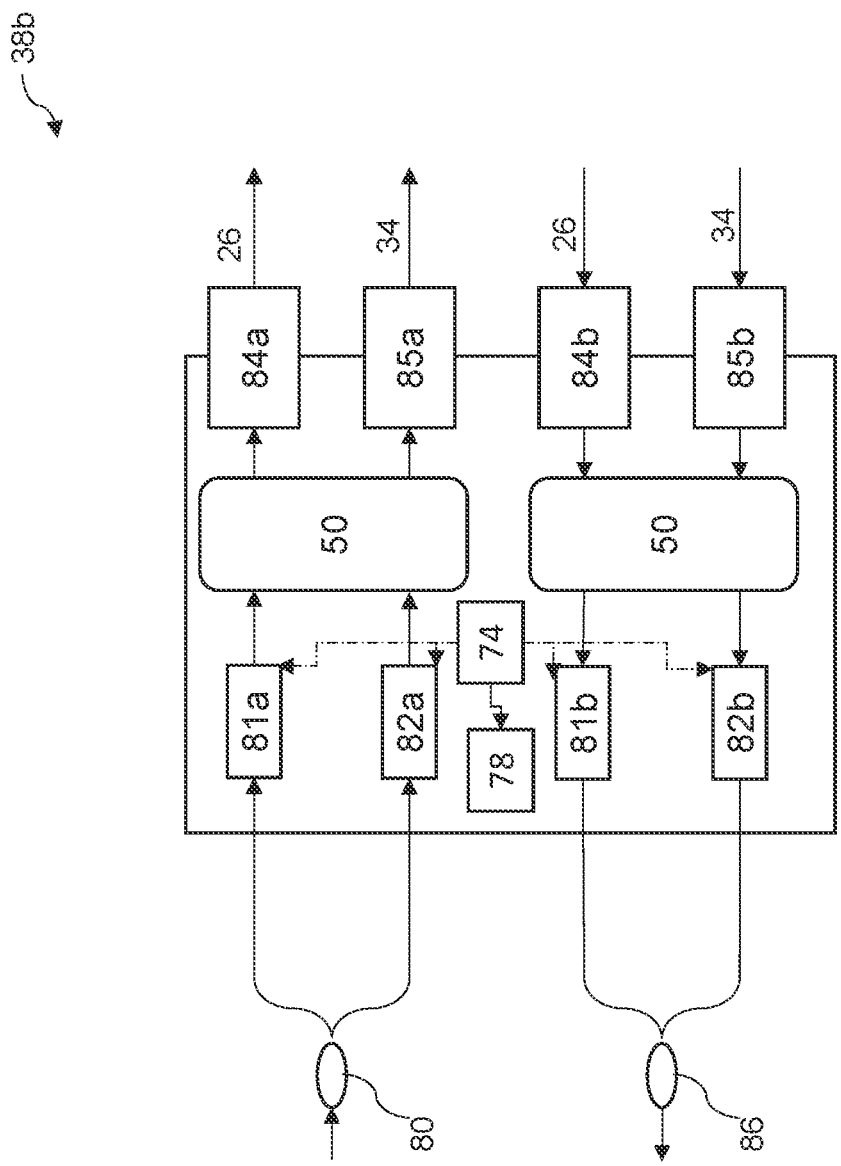

MULTI LAYER PROTECTION CONTROL FOR COHERENT DWDM NETWORKS

INCORPORATION BY REFERENCE

The present application claims priority to Provisional Patent Application U.S. Ser. No. 63/051,988 titled "Multi-Layer Protection Control for Coherent DWDM Networks" filed on Jul. 15, 2020, the entire contents of which are hereby expressly incorporated herein by reference.

BACKGROUND

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Optical networks may experience a failure between a transmitting node, i.e., an upstream node, and a receiving node, i.e., a downstream node. Traditionally, optical networks, such as integrated coherent DWDM networks, handling these failures may implement protection schemes at either the Layer 0 OSI layer or the Layer 1 OSI layer, which, when activated, causes the optical signal to be transmitted on a protection path between the headend node and the tailend node, instead of on a working path between the same nodes. Protection schemes at the various levels include an ODUk/j layer APS such as fabric switching and Y-cable based schemes, an OCH layer scheme using an OPSM, and a OTS layer using an OPSM. Optical networks implementing protection schemes that experience a failure, however, may cause the optical network to experience instability in the optical signal due to the protection schemes at one or more layer oscillating, or switching more than once between the working path and one or more protection path. Such oscillations cause instability in the optical signal which may cause further failures of the optical signal and/or may result in a loss of the optical signal for an undesirable length of time. For example, if digital traffic protection groups, e.g., UPSR/SNCP/Y-cable PGs, or SNCs are setup on optically protected links, the digital traffic protection groups will switch or restore upon detection of the failure in addition to switching or restoring performed in protection groups in Level 0, thereby causing redundant operations.

SUMMARY

A method and system are herein disclosed. The problem of redundant operations and network instability is solved by a terminal node, an optical network and/or a method described herein in which a first processor of a first optical protection switching module having a first optical switch, and a second processor of a second optical protection switching module having a second optical switch coordinate switching of the first optical switch and the second optical switch upon detection of a first failure by the first processor, or the detection of a second failure by the second processor. The first processor monitors optical signals received by a first line port to determine a first failure in a first working path at a first layer within an optical communication model. The second processor monitors the optical signals received by another line port to determine a second failure in the first working path at a second layer within the optical communication model. The first layer can be a physical layer, and the second layer can be an optical layer. In some embodiments, the first processor and the second processor coordinate switching by configuring the second processor with a holdover period such that upon detection of the second failure, the second processor switches the second optical switch after confirming the presence of the second failure after the passage of the holdover period.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 2C is a block diagram of an alternative exemplary embodiment of a terminal node constructed in accordance with the present disclosure.

DETAILED DESCRIPTION

Figure 1:
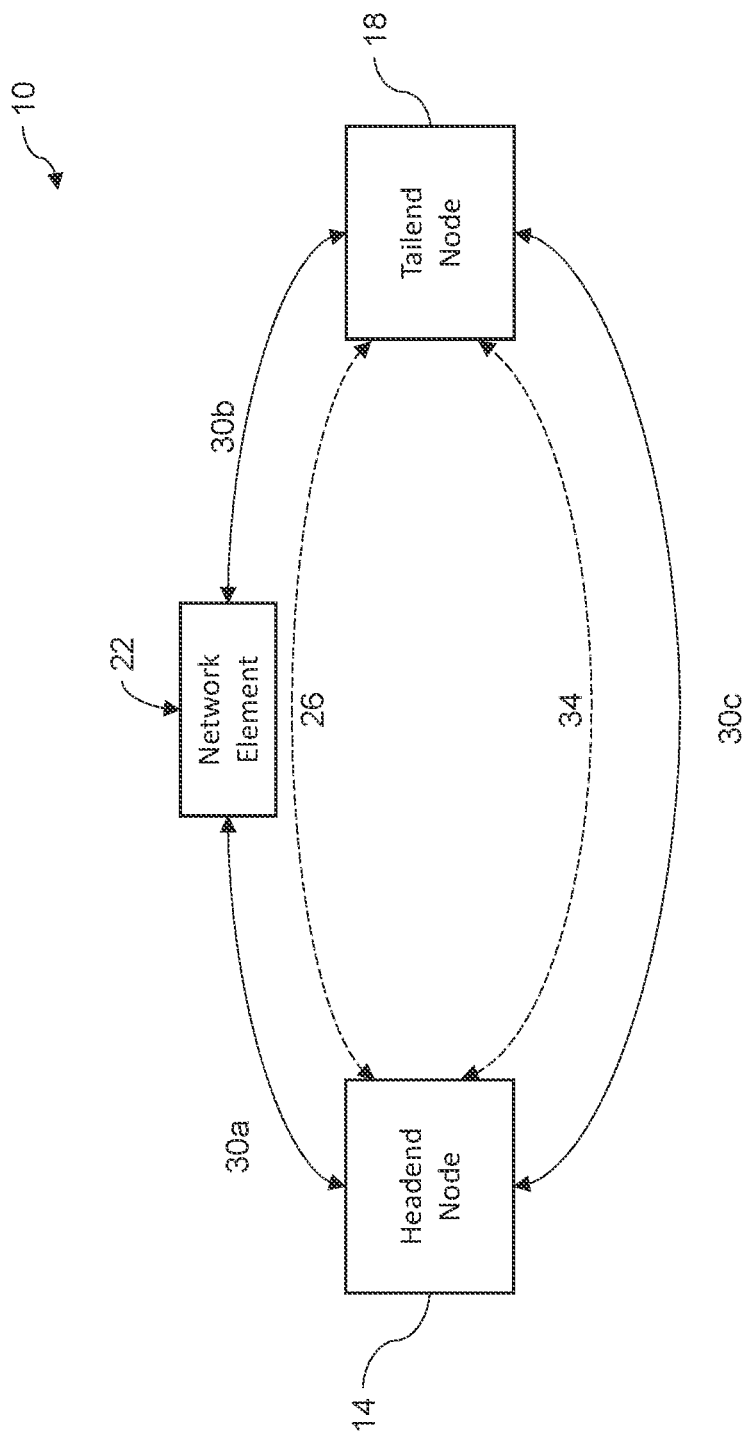
FIG. 1 is a block diagram of an exemplary embodiment of an optical network constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments.

The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

As used herein, the phrase "based on" is intended to mean "based, at least in part, on" unless explicitly stated otherwise.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An Optical Cross-Connect is a device for switching at least a portion of a spectrum of light in an optical signal received on an input optical port to any (one or more) output optical port. An optical cross-connect can be configured on ROADM network elements, with a built-in wavelength selective switch (WSS) component that is used to route an optical signal in any of the fiber degree or direction. For example, an exemplary optical cross connect can be formed within a wavelength selective switch by opening a specified channel, or specific spectrum of light on an input port of the wavelength selective switch. Configuring or pre-configuring an optical cross-connect may be accomplished by providing instructions to a device to cause the device to switch at least a portion of a spectrum of light in an optical signal received on an input port to any (one or more) output optical port.

As used herein, a span, or link, is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channel may be called a media channel. Spectral loading may also be described as the addition of one or more media channel to a specific spectrum of light described by the light's wavelength to be supplied onto the optical fiber as the optical signal.

A Super Channel, as used herein, is a group of wavelengths sufficiently spaced so as not to cause any interference among the group of wavelengths which are sourced from a single light source and managed as a single grouped entity for routing and signaling in an optical network. A super-channel, as used herein, may refer to multiple optical carriers, or channels, that are simultaneously transported over the same optical waveguide (e.g., a single mode optical fiber). Each optical carrier included in a super-channel may be associated with a particular optical wavelength (or set of optical wavelengths). The multiple optical carriers may be combined to create a super-channel using wavelength division multiplexing. For example, the multiple optical carriers may be combined using dense wavelength division multiplexing, in which carrier-to-carrier spacing may be less than one nanometer. In some implementations, each optical carrier may be modulated to carry an optical signal. A channel is further defined in the International Telecommunications Union Recommendation ITU-T G.694.1, "Spectral grids for WDM applications: DWDM frequency grid".

The methods and systems herein disclosed may be used in optical networks. In one embodiment, the optical network has one or more band. A band is the complete optical spectrum carried on the optical fiber. Depending on the fiber used and the supported spectrum which can be carried over long distances with the current technology, relevant examples of the same are: C-Band/L-Band/Extended-C-Band. As used herein, the C-Band is a band of light having a wavelength between about 1528.6 nm and about 1566.9 nm. The L-Band is a band of light having a wavelength between about 1569.2 nm and about 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a digital fault or fault signal is a fault condition reported and determined after coherent detection in an optical transponder (e.g. Line card). The fault condition may include one or more of the following: LOF—Loss of Frame, based on one or more of an OOF (out of Frame) defect, a OOM (Out of Multi-frame) defect, or a LOM (Loss of Multi-Frame) defect; a Backward Defect Indication (BDI) fault, a Remote BDI (RBDI) fault, a Backward signal degrade (BSD) fault, and/or a remote BSD (RBSD) fault. A BDI is an indication sent upstream by a downstream node detecting LOF.

As used herein, IETF stands for Internet Engineering Task Force.

As used herein, IP stands for Internet Protocol which is a protocol used for communicating data across a packet-switched internetwork using the Internet Protocol Suite, also referred to as TCP/IP.

As used herein, LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node). The headend node and the tailend node may be collectively referred to as endpoint nodes.

As used herein, LS is a light source, e.g., a card where data from a digital transport client is modulated/de-modulated to/from an optical channel. This is the place where the optical channel originates/terminates.

As used herein, OA is an Optical Amplifier, that is, a band control gain element generally EDFA or RAMAN based.

As used herein, OAM stands for Operation, Administration and Maintenance, a standardized terminology in transport networks used to monitor and manage the network.

As used herein, OLDP is Optical Layer Defect Propagation. OLDP is a fault propagation mechanism in the optical layer for OAM considerations and is used to facilitate protection or restoration using an overhead frame mapped to an OSC.

OPM (Optical Power Monitor device) stands for a device having a capability to monitor power on a per slice basis.

The Optical Supervisory Channel (OSC) is an additional wavelength that is adapted to carry information about the network and may be used for management functions. The OSC is carried on a different wavelength than wavelengths carrying actual data traffic and is an out-of-band channel. The OSC carries information about the multi-wavelength optical signal as well as remote conditions at the optical add/drop or OA sites. It is used for OAM in DWDM networks. It is the multi-wavelength analogue to SONET's DCC (or supervisory channel). Typically, the OSC is used hop-by-hop and is terminated and restarted at every node. The OSC may be defined based on The International Telecommunications Union (ITU) recommendation ITU-T G.709 to carry overhead corresponding to the layers. Additionally, ITU-T recommendation G.872 specifies defects for the OTS, OMS, and OCh layers as well as specifying Operation, Administration & Maintenance (OAM) requirements. The formation of the OSC is further defined, for example, in U.S. Pat. No. 9,485,124, entitled "Optical layer status exchange over OSC-OAM method for ROADM networks", issued Nov. 1, 2016.

A Slice is an N GHz (N=12.5, 6.25, 3.125) spaced frequency band of the whole of the optical spectrum. Each such constituent band is referred to in the art as a slice. A slice may be the resolution at which the power levels can be measured by the optical power monitoring device. The power level being measured by the optical power monitoring device represents the total optical power carried by the portion of the band represented by that slice. A superchannel pass-band is composed of a set of contiguous slices.

A WSS (Wavelength Selective Switch) is a component used in optical communications networks to route (switch) optical signals between optical fibers on a per-slice basis. Generally, power level controls can also be done by the WSS by specifying an attenuation level on a pass-band filter. A wavelength Selective Switch is a programmable device having source and destination fiber ports where the source and destination fiber ports and associated attenuation can be specified for a pass-band.

DESCRIPTION

An exemplary integrated optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical carriers and optical carrier groups (OCG), typically within the 1530 nm-1565 nm range, known as C-Band. ROADM functions are facilitated via colorless, directionless, and contentionless (CDC) wavelength selective switches (WSS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical carriers which are co-routed, e.g., together as multiple carriers.

Referring now to the drawings, and in particular to FIG. 1, shown therein is a block diagram of an exemplary embodiment of an optical network 10 constructed in accordance with the present disclosure. The optical network 10 is depicted as having a plurality of nodes including a headend node 14 and a tailend node 18, and a network element 22. Data transmitted within the optical network 10 from the headend node 14 to the tailend node 18 may travel along a working path 26 formed from a first span 30a, the network element 22, and, a second span 30b to the tailend node 18. Similarly, a protection path 34 from the headend node 14 to the tailend node 18 may be formed from a third span 30c.

Each path, i.e., the working path 26 and the protection path 34, may be considered a logical data transmission pathway between the headend node 14 and the tailend node 18, thus, each path may be described in either the optical domain or digital domain, or both the optical domain and the digital domain. The protection path 34 may be described as an alternative path, or a backup path, for the transmitted data to travel if the transmitted data is unable to travel along the working path 26. Further, while the working path 26 and the protection path 34 are described as transmitting data from the headend node 14 to the tailend node 18, each of the working path 26 and the protection path 34 may be bidirectional, that is, data may be transmitted from the tailend node 18 to the headend node 14. Generally, transmitted data traveling along the working path 26 or the protection path 34 is transmitted as an optical signal, e.g., exist in the optical domain, however, in certain network elements 22 described in more detail below, the transmitted data may be converted to an electrical signal, e.g., exist in the digital domain.

The optical network 10 may be, for example, an optical transport network (OTN). An Optical transport Network includes a set of optical switch nodes which are connected by fiber optic links or fiber optic cables. ITU-T recommendations G.709 and G.872 define OTN interface requirements and network architecture respectively. An exemplary OTN may contain multiple optical nodes, i.e., network elements 22, such as optical line terminals, optical cross connects, optical line amplifiers, optical add/drop multiplexer (OADMs) and/or reconfigurable optical add/drop multiplexers (ROADMs), interconnected by way of intermediate links or spans 30. Optical line terminals may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers"; U.S. Pat. No. 7,394,953 titled "Configurable Integrated Optical Combiners and Decombiners"; and U.S. Pat. No. 8,223,803 entitled "Programmable Time Division Multiplexed Switching," which are incorporated herein by reference in their entirety. Further, it should be understood that each node, e.g., headend node 14, network element 22 and tailend node 18, can be implemented in a variety of manners.

The headend node 14 and the tailend node 18 are each an optical line terminal node. Each optical line terminal node may either transmit or receive the optical signal in a fiber optic cable. In one embodiment, one or more of the headend node 14 and the tailend node 18 is a ROADM field replaceable unit (FRU) and/or a flex ROADM (FRM).

In one embodiment, the working path 26 is a data path from the headend node 14 to the tailend node 18 configured to carry transmitted data or other data traffic while there is no failure on the working path 26. If there is a failure on the working path 26, the working path 26 is said to be failed. As will be described in more detail below, if the working path 26 is failed, the data traffic may be switched to the protection path 34. Once the failure is resolved, the working path 26 may be considered recovered. The working path 26 can be restorable, non-revertive or revertive. Revertive is defined as a configuration where the data traffic is directed back to the working path 26 after the working path 26 is recovered. Non-revertive restoration is defined as a configuration where the data traffic is not directed back to the working path 26 after the working path 26 is recovered. An active path, as used herein, is used to identify the pathway along which data traffic is transmitting, i.e., is either the working path 26 if data traffic is being transmitted on the working path 26 or the protection path 34 if data traffic is being transmitted along the protection path 34.

In one embodiment, the failure indicates that the optical signal may not successfully reach the tailend node 18. The failure may include one or more of an optical loss of signal (OLOS), a problem with acquiring framing (i.e., determining frame boundaries), or a loss of frame (LOF) in the optical signal. Each failure may be determined for each of the one or more carriers or channels of a super channel of the optical signal. The failure may also include a FDI (forward defect indicator), FSD (forward signal degrade), a BDI (backward defect indicator), FSD/SD (forward signal degrade), and/or the like, for example.

The working path 26 and the protection path 34 may include one or more network element 22. Each network element 22 may have an element type, such as an optical in-line amplifier, an optical cross connect, an OADM, a ROADM, a regenerative node (regen node) or any other network component through which data traffic may flow in an optical network. While not shown in FIG. 1 for simplicity, the optical network 10 may also include one or more additional network element 22 within the first span 30a, the second span 30b, and/or the third span 30c. For example, one or more network element 22 may be intermediate the headend node 14 and the tailend node 18 within the third span 30c. Further, each network element 22 within the optical network 10 may have the same or different element type.

In one embodiment, the working path 26 and the protection path 34 may include one or more network element 22 that is a regen node. A regen node is a node of the optical network 10 that acts as an OEO converter, that is, an Optical-Electrical-Optical converter. In general, each regen node receives an input optical signal in an optical layer, converts the optical signal into a first digital data stream in a digital layer, processes the first digital data stream in the digital layer into a second digital data stream, encodes the second digital data stream into an output optical signal in the optical layer, and outputs the output optical signal.

Each span 30a-c is a fiber optic cable connecting each of the nodes in the working path 26 and the protection path 34 to at least one other node. In one embodiment, the network element 22 is an optical in-line amplifier, thus the first span 30a and the second span 30b may be an uninterrupted fiber optic cable, that is, there is no break or discontinuity in the fiber optic cable of the first span 30a and the second span 30b at the network element 22.

Figure 2A:
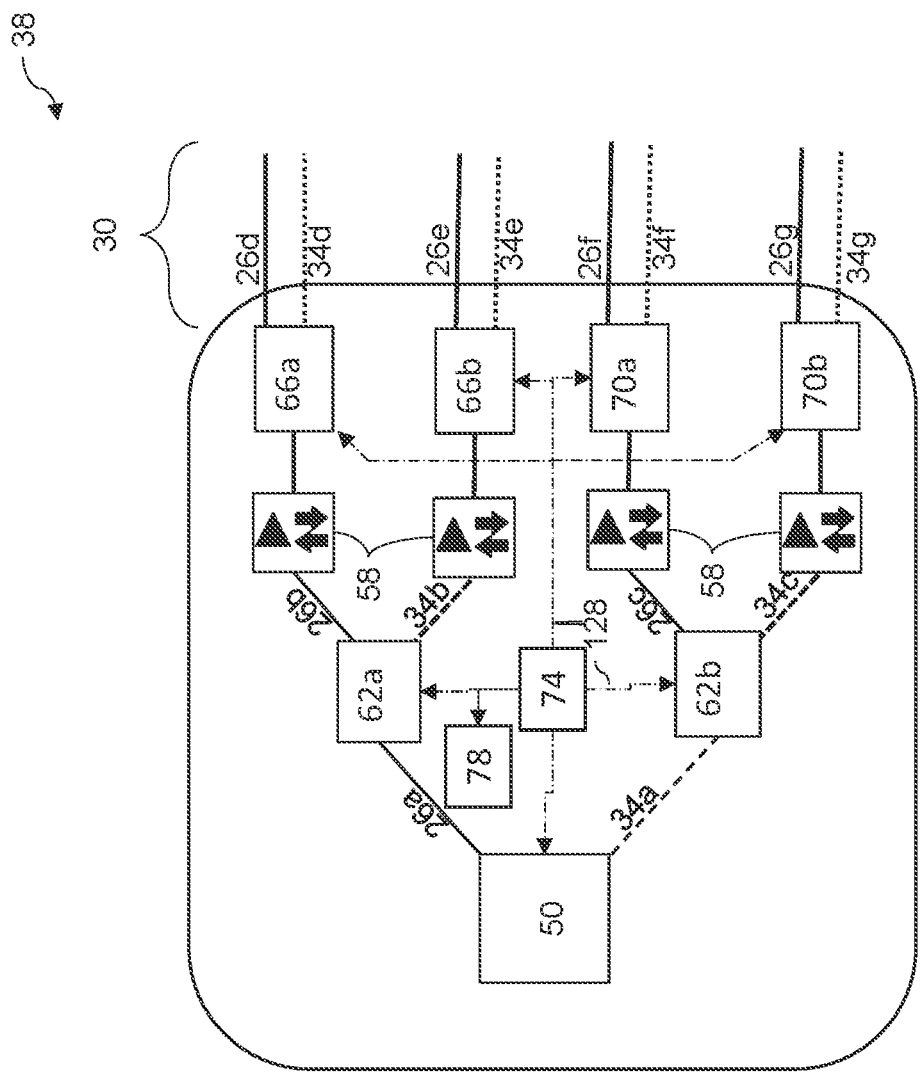
FIG. 2A is a block diagram of an exemplary embodiment of a terminal node constructed in accordance with the present disclosure.

Referring now to FIG. 2A, shown therein is a block diagram of an exemplary embodiment of a terminal node 38 constructed in accordance with the present disclosure, and can be used to implement the headend node 14 or the tailend node 18. The terminal node 38 generally comprises a flex ROADM such as ROADM 50, a plurality of optical protection switching modules 54 (OPSM 54) shown in FIG. 3 and described in more detail below, and one or more optical amplifier module 58.

In one embodiment, the ROADM 50 is in optical communication to a first working path 26a and a first protection path 34a. The plurality of OPSM 54 are illustrated in FIG. 2A as deployed on the OCH Layer, e.g., a Working OCH-OPSM 62a in optical communication with the first working path 26a and in optical communication with a second working path 26b and a second protection path 34b and a Protection OCH-OPSM 62b in optical communication with the first protection path 34a and in optical communication with the third working path 26c and the third protection path 34c, and on the OTS Layer, e.g., a first working OTS-OPSM 66a in optical communication with the second working path 26b and in optical communication with a fourth working path 26d and a fourth protection path 34d and a second working OTS-OPSM 66b in optical communication with the second protection path 34b and in optical communication with the fifth working path 26e and the fifth protection path 34e and a first protection OTS-OPSM 70a in optical communication with the third working path 26c and in optical communication with a sixth working path 26f and a sixth protection path 34f and a second protection OTS-OPSM 70b in optical communication with the third protection path 34c and in optical communication with the seventh working path 26g and the seventh protection path 34g.

As shown in FIG. 2A, each OTS-OPSM 66a-b, 70a-b is positioned intermediate each optical amplifier module 58 and each fiber optic cable of the span 30. Further, each OCH-OPSM 62a-b is coupled between the optical amplifier module 58 and the ROADM 50. The ROADM 50 encodes data traffic (e.g., GbE, ODUk/j, etc.) in the digital domain into the optical signal in the optical domain and/or decodes the optical signal in the optical domain into data traffic in the digital domain.

Figure 3:
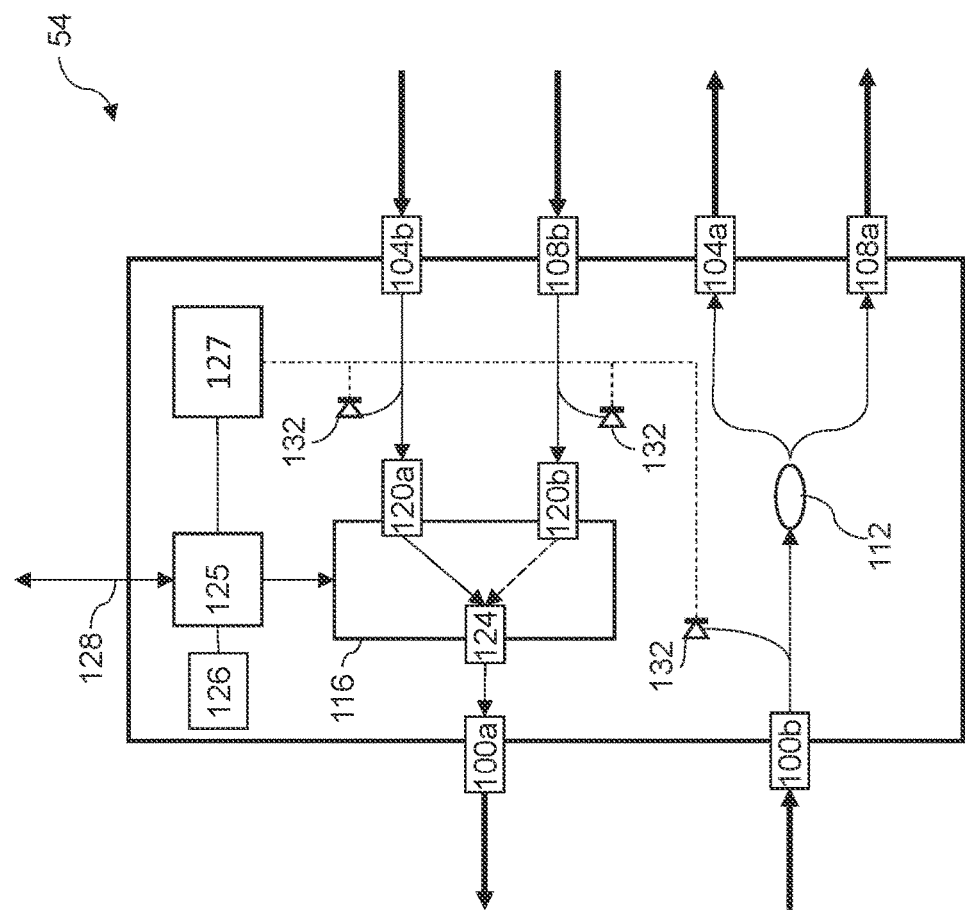
FIG. 3 is a block diagram of an exemplary embodiment of an optical protection switch module (OPSM) constructed in accordance with the present disclosure.

In one embodiment, the terminal node 38 further includes a processing module 74 and a memory 78. The memory 78 is a non-transitory computer accessible memory storing computer readable instructions that when executed by the processing module 74 cause the processing module 74 to perform one or more function. In one embodiment, the processing module 74 is in communication with each of the OCH-OPSM 62a-b and the OTS-OPSM 66a-b, 70a-b via control link 128. The processing module 74 may issue one or more control signal on the control link 128 to one or more particular OPSM of the OCH-OPSM 62a-b and the OTS-OPSM 66a-b, 70a-b thereby causing the one or more particular OPSM to switch as shown in FIG. 3 and described in more detail below. As used herein, a processing module may include one or more processor, microprocessor, ASIC, FPGA, and/or the like. Unless otherwise indicated, the term "processor" may refer to one or more processing module.

In one embodiment, the ROADM 50 receives data traffic (e.g., GbE, ODUk/j, etc.) and the data traffic is bridged to both the working path 26 (illustrated in FIG. 2A as a solid line) and the protection path 34 (illustrated in FIG. 2A as a dashed-line) as a DWDM signal (modulated wave). The ROADM 50 is operable to direct data traffic from the active path to an alternative path, e.g., from the working path 26 to the protection path 34, via Switch Fabric when a failure is detected in the active path. In this embodiment, the ROADM 50 may be a transponder or muxponder with a 1+1 switch fabric based ODUk/j APS protection scheme.

In one embodiment, the ROADM 50 will send a control signal to each of the OCH-OPSM 62a-b and the OTS-OPSM 70a-b to cause the optical signal to be transmitted on the active path, e.g., a particular one of the working path 26 or the protection path 34. In one embodiment, the ROADM 50, or transponder, may cause the optical signal to be transmitted on a particular path based on a quality of signal on the particular path.

The optical amplifier module 58 amplifies the optical signal before the optical signal enters a downstream OTS-OPSM 66a-b, 70a-b. In one embodiment, the optical amplifier module 58 receives the optical signal and may output, in addition to the optical signal, amplified spontaneous emission (ASE) light at wavelengths other than the optical signal wavelength. Such ASE light may include wavelengths that extend into and overlap with the optical signal wavelengths.

In one embodiment, the optical amplifier module 58 is an erbium doped amplifier. In one embodiment, the optical amplifier module 58 implemented in a terminal node may be used to close high attenuation links between the terminal node in conjunction with one or more network element 22, such as a dedicated Optical Amplifier or optical in-line amplifier node.

Figure 2B:
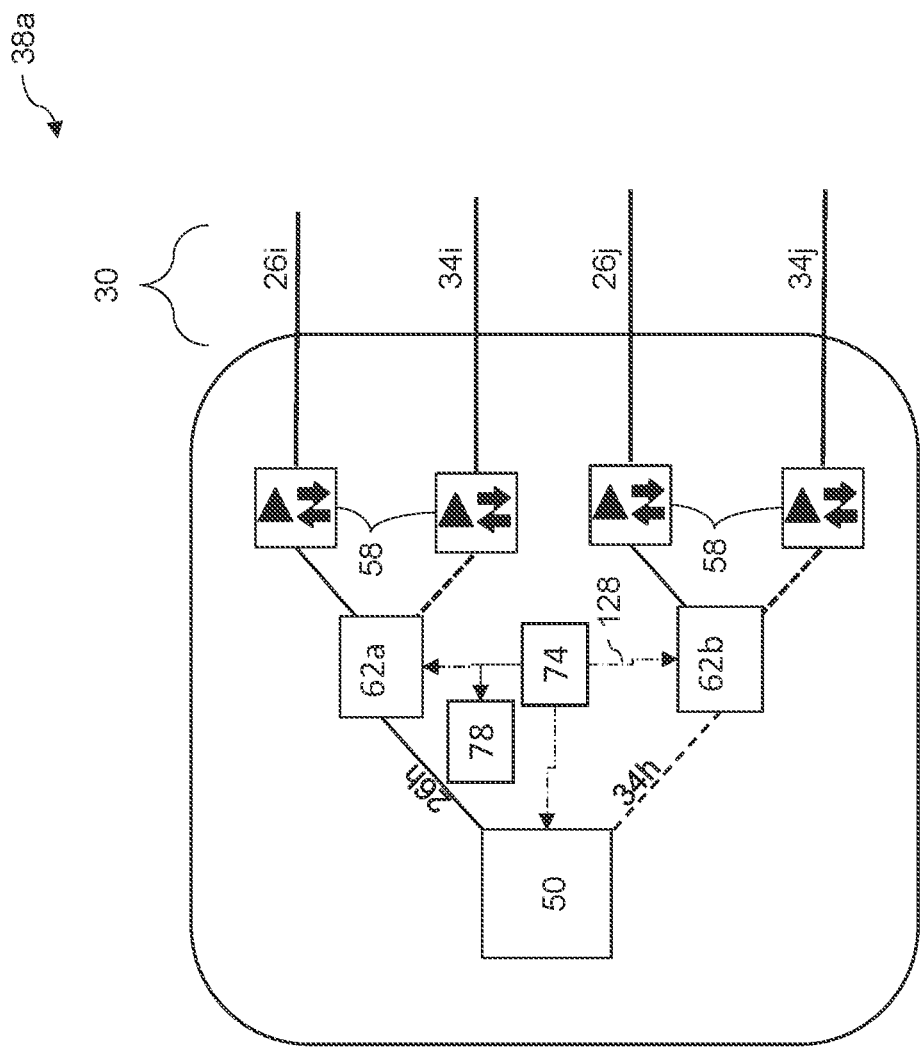
FIG. 2B is a block diagram of an alternative exemplary embodiment of a terminal node constructed in accordance with the present disclosure.

Referring now to FIG. 2B, shown therein is a block diagram of an alternative exemplary embodiment of a terminal node 38a constructed in accordance with the present disclosure, and can be used to implement the headend node 14 or the tailend node 18. The terminal node 38a is generally constructed similar to the terminal node 38 with the exception that the terminal node 38a does not include the OTS-OPSM 66a-b and the OTS-OPSM 70a-b. As such, in one embodiment, the terminal node 38a includes the processing module 74 and the memory 78. The processing module 74 is in communication with each of the OCH-OPSM 62a-b and the ROADM 50 via control link 128. The processing module 74 may issue one or more control signal on the control link 128 to one or more particular OPSM of the OCH-OPSM 62a-b or the ROADM 50 thereby causing the one or more particular OPSM or ROADM to switch from a working path to a protection path, or vice versa.

In one embodiment, the ROADM 50 is in optical communication to an eighth working path 26h and an eighth protection path 34h. The plurality of OPSM 54 are illustrated in FIG. 2B as deployed on the OCH Layer, e.g., a Working OCH-OPSM 62a in optical communication with the eighth working path 26h and in optical communication with a ninth working path 26i and a ninth protection path 34i and a Protection OCH-OPSM 62b in optical communication with the eighth protection path 34h and in optical communication with the tenth working path 26j and the tenth protection path 34j.

Referring now to FIG. 2C, shown therein is a block diagram of an exemplary embodiment of a terminal node 38b constructed in accordance with the present disclosure. In one embodiment, the ROADM 50 is a transponder with a Y-cable based protection group. The Y-cable based protection scheme relies on a passive fiber optic cable and is controlled via client laser. Shown in FIG. 2C, the terminal node 38b has Y-cable protection, that is, 1+1 Dual-TIM Digital SNCP Protection. Here the optical signal enters optical power splitter 80 where a first portion of the optical signal continues to a first work TIM 81a and a second portion of the optical signal continues to a first protection TIM 82b, where each TIM is a trib module. The optical power splitter 80 may be a 50:50 power splitter, meaning the optical signal having an optical power entering the optical power splitter 80 is split to the first work TIM 81a with half the optical power and to the first protection TIM 82a with half the optical power. Traffic selection is performed by the processing module 74 activating either the first work TIM 81a or the first protect TIM 82a. The Y-cable combines optical signals traveling in a first direction and splits optical signals traveling in a second direction opposite the first direction. Each of the first work TIM 81a or the first protect TIM 82a include a client laser, and when the client laser is activated by the processing module 74, the data traffic is transmitted to the working path 26 via the ROADM 50 via a work line module 84a. Conversely, when the client laser is not activated, the data traffic is transmitted to the protection path 34 via the ROADM 50 via a protect line module 85a. The optical signal in the second direction enters the terminal node 38b via the work line module 84b and/or the protect line module 85b and enters the ROADM 50 where the optical signal from the work line module 84b continues to a second work TIM 81b and the optical signal from the protect line module 85b continues to a second protection TIM 82b, where both optical signals continue to power coupler/combiner 86. If the second work TIM 84b or the first work TIM 84a detect a failure, the processing module 74 causes the optical signal to be selected from the protection path 34 ODUk layer (discussed in more detail below).

Referring now to FIG. 3, shown therein is a block diagram of an exemplary embodiment of the OPSM 54 constructed in accordance with the present disclosure. The OPSM 54 is an optical switch-based module providing switching in the optical layer. The OPSM 54 facilitates traffic recovery in the optical network 10. Protection requires that the same optical signal is sent on both the working path 26 and the protection path 34, such as by transmitting the same optical signal from the headend node 14 to the tailend node 18. Additionally, the OPSM 54 can be deployed to provide protection at either the OTS Layer or at the OCH Layer as illustrated in FIG. 2A and FIG. 2B and described in more detail below.

The OPSM 54 generally comprises at least a system port 100, a first line port 104 and a second line port 108; however, to better illustrate the functionality of the OPSM 54, FIG. 3 depicts a separate port for transmitting and receiving for each of the ports. Thus, as shown in FIG. 3, the OPSM 54 comprises a transmit system port 100a and a receive system port 100b, a transmit first line port 104a and a receive first line port 104b, and a transmit second line port 108a and a receive second line port 108b. While the transmit system port 100a and the receive system port 100b, the transmit first line port 104a and the receive first line port 104b, and the transmit second line port 108a and the receive second line port 108b are shown separately for purposes of clarity, it should be understood that one or more of the transmit system port 100a and the receive system port 100b, the transmit first line port 104a and the receive first line port 104b, and/or the transmit second line port 108a and the receive second line port 108b may be a single port and implemented as a single device in the OPSM 54.

Also shown in FIG. 3 is a power splitter 112 dividing a power of the optical signal on the receive system port 100b to each of the transmit first line port 104a and the transmit second line port 108a. In one embodiment, the power splitter 112 divides the power equally between the transmit first line port 104a and the transmit second line port 108a, however, in other embodiments, the power splitter 112 may divide the power unequally between the transmit first line port 104a and the transmit second line port 108a. The OPSM 54 further includes an optical switch 116. The optical switch 116 has a first input 120a optically connected to the receive first line port 104b and a second input 120b optically connected to the receive second line port 108b. The optical switch 116 selectively, optically connects either the receive first line port 104b and the receive second line port 108b to an output 124, which is optically connected to the transmit system port 100a. The OPSM 54 may further include a processing module 125 in communication with a memory 126, an A/D converter 127, and a control link 128 connected to the processing module 125. In one embodiment, each photodiode 132 measures an optical power (power) of the optical signal.

In one embodiment, the optical switch 116 may include an optical switch settling time, i.e., a period of time it takes for the optical switch 116 to settle after switching. The optical switch settling time is the time it takes the optical switch 116 to switch from connecting the first input 120a to the output 124 to connecting the second input 120b to the output 124.

The optical switch settling time may be determined by a manufacturer of the optical switch 116. A non-limiting embodiment of a typical optical switch settling time, after detection of an OLOS or after a manual or forced switch command, is from about 1 ms to about 8 ms. It is understood that technological advancements could decrease the typical optical switch settling time and that a shorter optical switch settling time is applicable within the present disclosure.

In one embodiment, the control link 128 may receive a control signal, for example, when the OPSM 54 is in the terminal node 38, from the processing module 74, operable to cause the optical switch 116 to selectable, optically connect either the receive first line port 104b and the receive second line port 108b to the output 124. In one embodiment, one or more photodiode 132 may be placed to optically detect a power from an optical signal received at any receive port, such as the receive system port 100b, the receive first line port 104b, and/or the receive second line port 108b. In one embodiment, the processing module 125 may receive configuration information via the control link 128 and store this configuration information in the memory 126.

Figure 6:
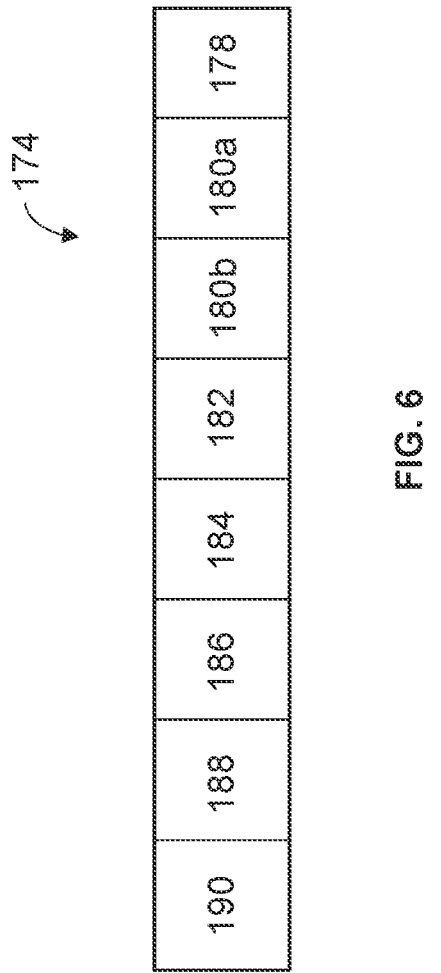
FIG. 6 is a block diagram of an exemplary embodiment of an OLDP frame constructed in accordance with the present disclosure.

In one embodiment, the memory 126 is a non-transitory memory storing processor executable instructions. The processor executable instructions include one or more instructions implementing a protection control process 200 as shown in FIG. 6 and described in detail below.

In one embodiment, the processing module 125 is in communication with the A/D converter 127. The A/D converter 127 is in communication with the one or more photodiode 132 and converts an analog signal received from a particular photodiode 132 into a digital signal that is sent to the processing module 125. The processing module 125 receives, or reads, the digital signal to determine whether the optical signal measured by that particular photodiode 132 has experienced a failure by comparing whether the power measured by that particular photodiode 132 is within a power threshold. If the processing module 125 determines that the optical signal is failed, the processing module 125 may send a signal on the control link 128 to identify the optical signal as failed.

In one embodiment where the OPSM 54 is deployed on the OTS Layer, the OPSM 54 will monitor a complete Band signal (i.e., either the C-Band, the L-Band, or both) and may provide protection against failure in the fiber optic cable in the span 30. In this embodiment, the protection may be provided against cuts in the fiber optic cable by detecting, by the processing module 125, an optical loss of signal (OLOS) using the one or more photodiode 132.

In yet another embodiment, the OPSM 54 is deployed on the OCH Layer such that the OPSM 54 is operable to provide protection to a particular optical channel or to a particular group of optical channels. In this embodiment, the OPSM 54 can provide protection by either detecting OLOS (e.g., by utilizing the one or more photodiode 132) or by digital domain fault detection and reporting by an upstream node, that is received, for example, by way of the control link 128. In some embodiments, digital domain fault detection and reporting by the upstream node results in a more reliable switching process because the optical switch 116 can be caused to switch based on digital domain triggers. In one embodiment, a line module, either upstream or downstream from the OPSM 54, may cause the optical switch 116 to switch.

Figure 4B:
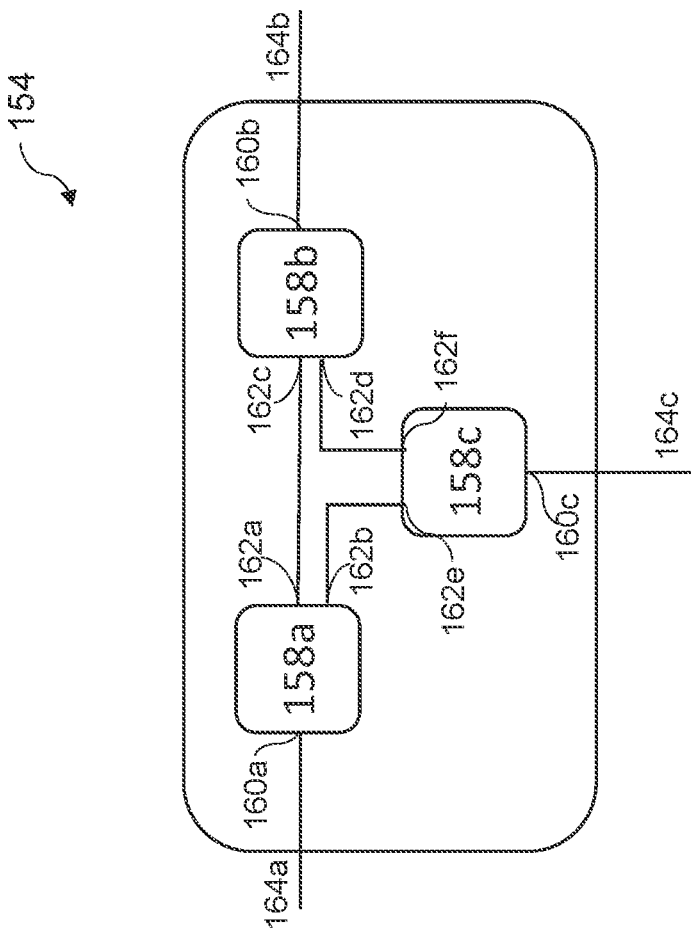
FIG. 4B is a block diagram of an exemplary embodiment of an optical express module of the express node of FIG. 4A constructed in accordance with the present disclosure.
Figure 4A:
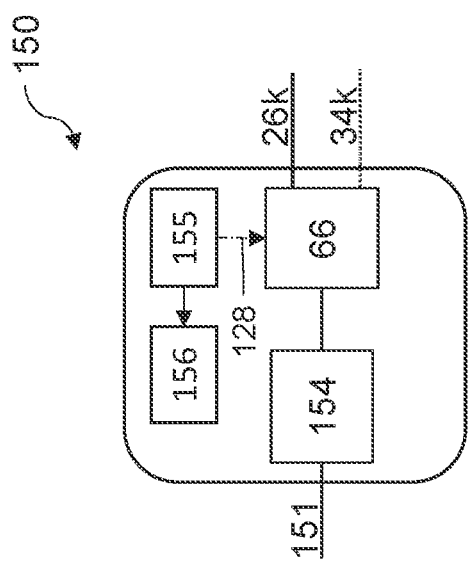
FIG. 4A is a block diagram of an exemplary embodiment of an express node constructed in accordance with the present disclosure.

Referring now to FIG. 4A, shown therein is a block diagram of an exemplary embodiment of an express node 150. The express node 150 is a particular embodiment of a network element 22 wherein the optical signal is not regenerated, that is, wherein the optical signal is not decoded into the digital signal and then encoded into the optical signal. The express node 150 generally comprises an OTS-OPSM 66 and at least an optical express module 154 as shown in FIG. 4B. In one embodiment, the express node 150 may include a processing module 155 and a memory 156. The processing module 155 and the memory 156 may be constructed similarly to the processing module 74 and the memory 78 described above. The processing module 155 may be in communication with the OTS-OPSM 66 via control link 128 and operable to send one or more control signal via the control link 128 to the OTS-OPSM 66. In another embodiment, the processing module 155 and the memory 156 may be integrated into the OTS-OPSM 66 such as into the processing module 125 and the memory 126 respectively.

In one embodiment, optical express module 154 of the express node 150 may be optically connected to a system path 151 and the OTS-OPSM 66 is connected to an eleventh working path 26k and an eleventh protection path 34k. The system path 151 may be a working path 26 or a protection path 34. For example, If the express node 150 is connected downstream from the terminal node 38a, the system path 151 may be any of the ninth working path 26i, the tenth working path 26j, the ninth protection path 34i, and the tenth protection path 34j. In other words, the system path 151 is a path along which the express node 150 receives an optical signal.

Referring now to FIG. 4B, shown therein is a block diagram of an exemplary embodiment of the optical express module 154. The optical express module 154 is composed of one or more flex ROADM module (FRM) 158. In one embodiment, the optical express module 154 is a 3-degree optical express module 154 comprising FRM 158a, FRM 158b, and FRM 158c. Each FRM 158 includes at least one line port 160 and at least two system interfaces 162 configured such that each system interface 162 of a particular FRM 158 is connected to a system interface 162 of a different FRM 158. As shown in FIG. 4B, the FRM 158a includes a line port 160a, a first system interface 162a and a second system interface 162b; the FRM 158b includes a line port 160b, a first system interface 162c and a second system interface 162d; and the FRM 158c includes a line port 160c, a first system interface 162e and a second system interface 162f. As shown, the first system interface 162a of the FRM 158a is connected to the first system interface 162c of the FRM 158b; the second system interface 162b of the FRM 158a is connected to the first system interface 162e of the FRM 158c; and the second system interface 162d of the FRM 158b is connected to the second system interface 162f of the FRM 158c. In other embodiments, the optical express module 154 is an n-degree optical express module 154 where the number of degrees, n, is accomplished and/or determined by the number of FRM 158. Each line port 160 is optically connected to a different fiber optic cable 164, such that the line port 160a is optically connected to fiber optic cable 164a, the line port 160b is optically connected to fiber optic cable 164b, and the line port 160c is optically connected to fiber optic cable 164c.

Figure 5:
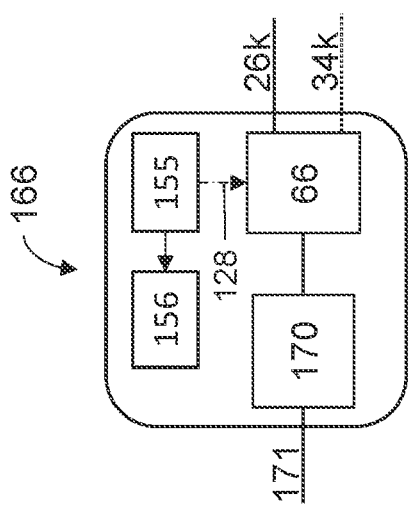
FIG. 5 is a block diagram of an exemplary embodiment of an optical amplifier node constructed in accordance with the present disclosure.

Referring now to FIG. 5, shown therein is a block diagram of an exemplary embodiment of an optical amplifier node 166 (OA node 166). The OA node 166 is a particular embodiment of a network element 22 wherein the optical signal is optically amplified without first converting the optical signal in the optical domain into an electrical signal in the digital domain. The OA node 166 generally comprises at least an OTS-OPSM 66 and an optical amplifier module 170. In one embodiment, the OA node 166 may include a processing module 155 and a memory 156. The processing module 155 and the memory 156 may be constructed similarly to the processing module 74 and the memory 78 described above. The processing module 155 may be in communication with the OTS-OPSM 66 via control link 128 and may be operable to send one or more control signal via the control link 128 to the OTS-OPSM 66.

In one embodiment, optical amplifier module 170 of the OA node 166 may be optically connected to a system path 171 and the OTS-OPSM 66 is connected to an eleventh working path 26k and an eleventh protection path 34k. The system path 171 may be a working path 26 or a protection path 34. For example, If the OA node 166 is connected downstream from the terminal node 38a, the system path 171 may be any of the ninth working path 26i, the tenth working path 26j, the ninth protection path 34i, and the tenth protection path 34j. In other words, the system path 171 is a path along which the OA node 166 receives an optical signal.

Referring now to FIG. 6, shown therein is a block diagram of an exemplary embodiment of an OLDP frame 174 generally comprising 8 (eight) bits including a BDI-P bit 178, a first stat bit 180a, a second stat bit 180b, a BDI-O bit 182, an FDI-O bit 184, a CSF bit 186, an OTSP bit 188 and an unassigned bit 190. In one embodiment, the OTSP bit 188 is a bit indicative of the current optical transport section protection (OTSP) status. The OLDP frame 174 is an optical layer defect propagation super-channel overhead frame (OLDP SCH OH). The OLDP frame 174 may be used to signal OTSP as part of an OLDP protocol that operates on the OSC to carry defect propagation information across the optical domain network element 22. In one embodiment, the OLDP protocol can carry defect information for OTS, OMS, and up to 192 SCH/OCH layers in frame format. In one embodiment, the OTSP bit 188 is added and/or dropped at every span endpoint, e.g., when the network element 22 is an O-E-O network element 22, and the OLDP frame 174 is added and/or dropped at Add-Drop nodes, e.g., a terminal node 38.

The first stat bit 180a and the second stat bit 180b may be used to identify the status of the optical signal, such as, for example, Normal, Forward Defect Indication (FDI), Forward Signal Degrade (FSD), or OCI.

In one embodiment where the OTSP status is passed through a particular network element without performing an O-E-O encoding, such as express node 150 or amplifier node 166, OTS protection status is propagated to both the headend node 14 and the tailend node 18 of all protected SCHs detected by including, or setting, the OTSP bit 188 in the OLDP frame 174. In the particular network element, the OLDP frame 174 is transparently passed through the particular network element, that is, the particular network element does not decode/encode the OLDP frame 174. Thus, the OTSP bit 188 can signal OTSP status from one or more intermediate node, such as, for example, a regen node, to endpoint nodes, such as each terminal node 38.

It should be understood that, while the OLDP frame 174 is described as operating in conjunction with the OLDP protocol, including, or setting, the OTSP bit 188 may be performed in conjunction with any protocol that operates in the OSC, e.g., by designating a particular bit in an overhead frame as the OTSP bit 188, thus, enabling transmission of OTSP status from any intermediate node to an Add-Drop node, such as the terminal node 38. In one embodiment, the OTSP status may be referred to as OTS-OTSP status if the OTSP status refers to the OTS Layer and as OCH-OTSP status if the OTSP status refers to the OCH Layer. In either case, the OTSP status is encoded in the OTSP bit 188 in the OLDP frame 174 and transmitted on the OSC.

Figure 7:
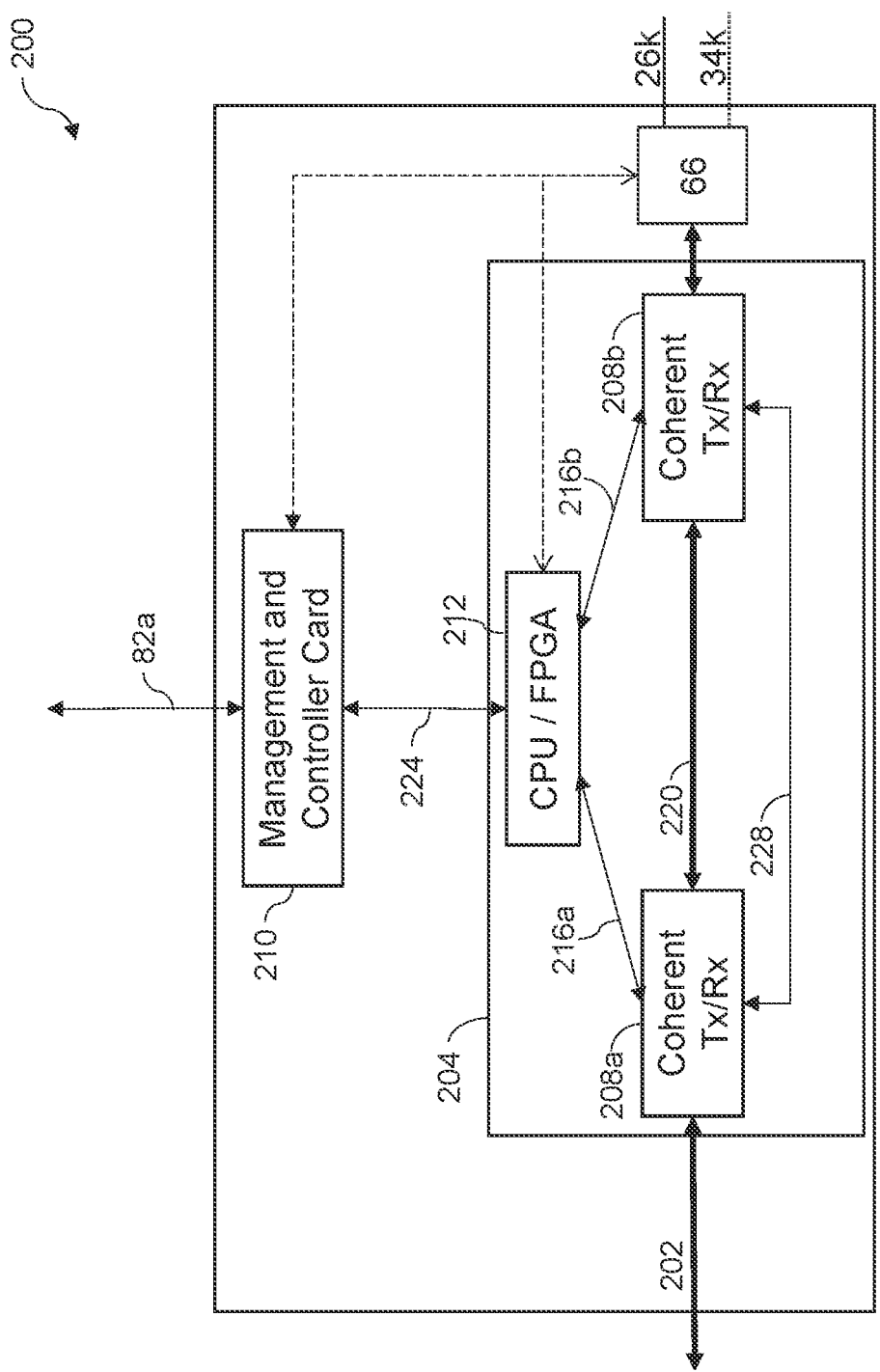
FIG. 7 is a block diagram of an exemplary embodiment of a regen node constructed in accordance with the present disclosure.

Referring now to FIG. 7, shown therein is a block diagram of an exemplary embodiment of a regen node 200 constructed in accordance with the present disclosure. Generally, the regen node 200 includes one or more line card 204 having one or more coherent transceiver 208, such as first coherent transceiver 208a and second coherent transceiver 208b, and a control module 210. Each coherent transceiver 208 may include circuitry such as a coherent receiver, a coherent transmitter, or a combination of both a coherent receiver and coherent transmitter.

As shown in FIG. 7, a system path 202 is optically connected to the first coherent transceiver 208a of the line card 204 and enables the first coherent transceiver 208a of the line card 204 to receive the optical signal in the optical layer. The first coherent transceiver 208a, in communication with a processing module 212 via a first processor path 216a, converts the optical signal in the optical layer to a first digital data stream in a digital layer and sends the first digital data stream along a data path 220. The data path 220 connects the first coherent transceiver 208a to the second coherent transceiver 208b to enable the first digital data stream to be received by the second coherent transceiver 208b. The processing module 212 communicates with the second coherent transceiver 208b via a second processor path 216b, and further communicates with the control module 210 via a config path 224. The control module 210 may communicate with a control system (not shown) via a management path 228. The first coherent transceiver 208a and the second coherent transceiver 208b may communicate via a status path 228. The second coherent transceiver 208b, in communication with the processing module 212 via the second processor path 216b, encodes the first digital data stream and any additional information from the processing module 212, into a second optical signal in the optical layer, and transmits the second optical signal on a downstream span 30 via either an eleventh working path 26k or an eleventh protection path 34k.

In one embodiment, the processing module 212 may include circuitry. Circuitry could be analog and/or digital, components, or one or more suitably programmed microprocessors and associated hardware and software, or hardwired logic. Additionally, certain portions of the implementation have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations. In one embodiment, the processing module 212 includes an FPGA in place of or in addition to the processing module.

In one embodiment, the control module 210 provides a user interface for controlling system capabilities, including data path programming, alarming, and/or notifications. In one embodiment, the control module 210 may include a processing module 212 having a processor and non-transitory processor readable memory (memory) storing executable instructions that when executed by the processor cause the processor to perform one or more tasks. In one embodiment, the processing module 212 includes an FPGA in place of or in addition to the processor. In one embodiment, the control module 210 includes software stored on the memory to perform management functions such as configuring one or more line card 204, and/or configure one or more OPSM 54, when present, for data path 220 operations. The control module 210 of the regen node 200 in the optical network 10 function together to aid in the control and management of the optical network 10. The control module 210 can run a variety of protocols for conducting the control and management (i.e., Operation, Administration, and Maintenance—referred to as OAM) of the optical network 10. One prominent protocol is referred to in the art as Generalized Multiprotocol Label Switching (GMPLS).

The regen node 200 is bidirectional, however a second direction is not illustrated in FIG. 7 for simplicity. As such, a "receive direction" refers to a direction from which the optical signal enters the regen node 200, which may also be referred to as upstream or the upstream direction and a "transmit direction" refers to a direction to which the optical signal exits the regen node 200, which may also be referred to as downstream or the downstream direction.

In one embodiment, the coherent transceiver 208a in the receive direction, that is, when receiving the optical signal, acts as a coherent receiver and performs coherent detection, OLDP frame 174 extraction from the OSC, and processing. The OLDP frame 174 may include the OTSP bit 188 (described above). The optical signal, on the optical layer, containing one or more channel as a super channel and an OSC having the OLDP frame 174 for the optical network 10 is received by the coherent transceiver 208a. When the coherent transceiver 208a receives the optical signal on the optical layer, the optical signal is converted to the digital layer into at least a digital data stream including data traffic from an upstream node and into the OTSP status OTSP bit 188. The OTSP status may be carried over one or more OLDP frame 174. The conversion from the optical layer to the digital layer may be performed, at least in part, by a digital signal processor (DSP) of the first coherent transceiver 208a.

In one embodiment, detecting a failure of the working path 26 may be performed by monitoring at least one parameter of the optical layer, such as, for example the OTSP status. Similarly, detecting a failure of the protection path 33 may be performed by monitoring at least one parameter of the optical layer, such as, the OTSP status.

In one embodiment, each coherent transceiver 208 may detect one or more fault in the optical signal. The one or more fault may be configured as an OTSP status in an OTSP bit 188 and provided within the OLDP frame 174, which is encoded with the first digital data stream into the second optical signal and transmitted to a downstream node by the second coherent transceiver 208b. Each of the one or more fault may be determined for each of the one or more super channel of the optical signal. Detecting the one or more fault in the optical signal may include detecting a fault condition at the regen node 200.

Figure 8:
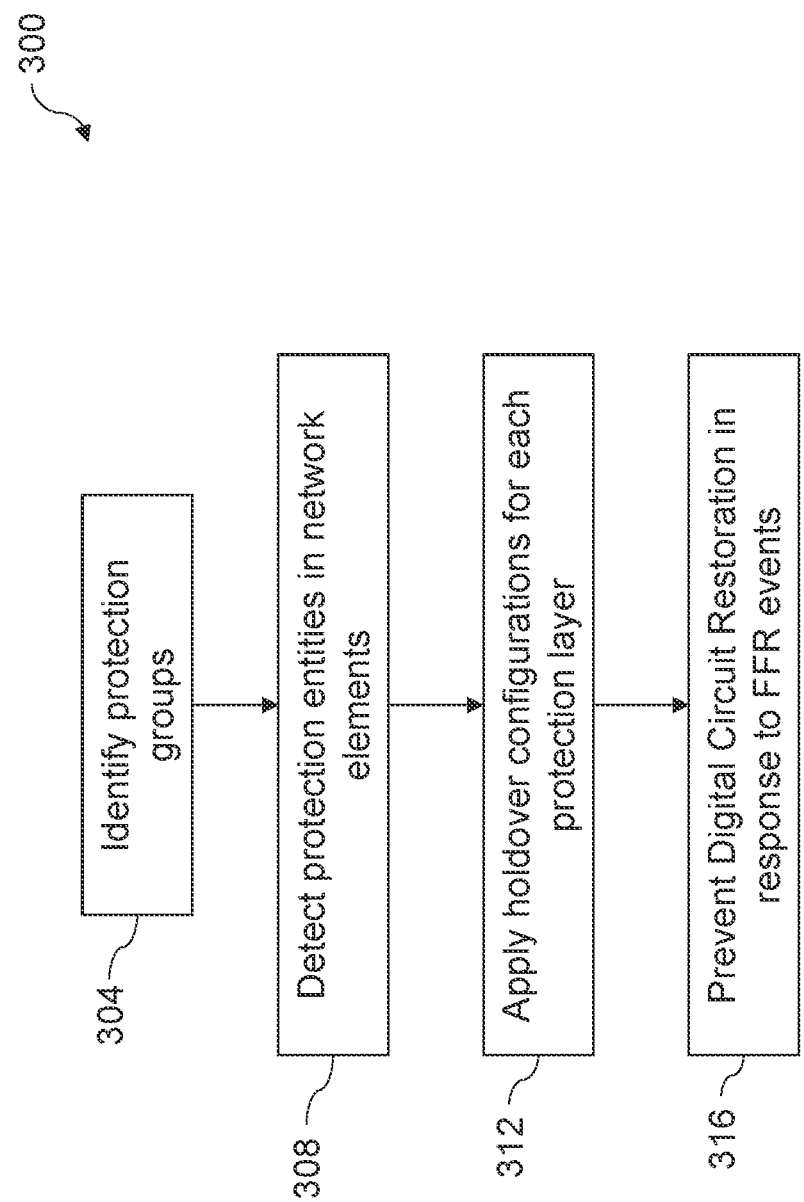
FIG. 8 is a flow diagram of an exemplary embodiment of a protection control process in accordance with the present disclosure.

Referring now to FIG. 8, shown therein is a flow diagram of an exemplary embodiment of a protection control process 300 in accordance with the present disclosure. The protection control process 300 "stitches" protection at different layers to provide a seamless protection path failure detection and response. Generally, the protection control process 300 comprises the steps of identifying protection groups (step 304); detecting protection entities in network elements (step 308); applying holdover configurations for each protection layer (step 312); and preventing digital circuit restoration in response to FFR events (step 316). In one embodiment, the protection control process 300 is executed by one or more processing module.

In one embodiment, identifying protection groups (step 304) includes automatically identifying multi-layer protection groups L0, such as 1+1 APS, and YPG, and L1 (OCH/SCH and OTS/OMS) configured within the same network element by virtue of provisioning information. A protection unit is an atomic unit of signal monitoring for protection event detection, such as a monitoring entity, and a protection group is an entity containing a reliable end-point and a pair of protection units signifying the working path 26 and the protection path 34. In one embodiment, provisioning information is provided by a user and includes configuration information for one or more protection group, that is, the user may provide provisioning information for one or more network element 22, headend node 14, and/or tailend node 18 where the provisioning information defines a configuration for each protection group. Additionally, the provisioning information may include configuration information defining a relationship between each of the OTS Layer and the OCH Layer.

In one embodiment, the user provides provisioning information by sending the provisioning information to the processing module of one or more terminal node 38, express node 150 or OA node 166, regen node 200, and/or OPSM 54. Each processing module may communicate with and store provisioning information to the memory to which the processing module is in communication.

In one embodiment, the monitoring entity may include, for example, the processing module 125 in communication with the A/D converter 127 receiving analog signals from one or more of the photodiodes 132 within the OPSM 54 as a monitoring unit. Each monitoring entity may include one or more monitoring unit and/or may receive a failure signal through a fault propagation mechanism received over the control link 128, such as, for example, those described in U.S. patent application Ser. No. 16/998,159 entitled "SD-FEC DEFECT PROPAGATION ACROSS REGENERATION NODES IN SUPPORT OF SINGLE AND MULTI-CARRIER SUPER CHANNEL PROTECTION IN ROADM NETWORKS" filed on Aug. 20, 2020, the entire contents of which as hereby incorporated by reference.

In one embodiment, the user may establish protection groups that span multiple layers, not just multiple channels or wavelengths by supplying the provisioning information. In one embodiment, the provisioning information may include switching criteria. The switching criteria may be based on OLOS, or a combination of OLOS and OLDP faults which may be forwarded with Digital Carrier Faults detected by a transponder/muxponder.

In one embodiment, detecting protection entities in network elements (step 308) includes detecting a protection entity within the same network element 22. In this embodiment, protection entity detection may be determined by the processing module in each of the terminal node 38, express node 150 or OA node 166, regen node 200, and/or the OPSM 54 or may be previously stored within a particular memory and accessed by the processing module in communication with that particular memory.

In another embodiment, detecting protection entities in network elements (step 308) includes receiving protection entity information from another network element, which may be the same as or different from the network element 22 and may include the express node 150, the OA node 166, and/or the regen node 200, for example. In this embodiment, detecting protection entities may be performed by detecting OTSP status, i.e., detecting the OTSP bit 188 within the OLDP frame 174. The other network element may be either upstream or downstream from the network element 22, thus providing an aggregate protection.

In one embodiment, applying holdover configurations for each protection layer (step 312) is performed within the network element 22. A holdover is a specific period of time for which a particular OPSM 54 waits between the time that a fault is detected and the time that the OPSM 54 activates the optical switch 116. The holdover configuration may include one or more holdover period for each OPSM 54 within the network element 22. The holdover period for each OPSM 54 may be either configured by the user using provisioning information or it may be determined based on the location the OPSM is within the network element 22, for example, if the OPSM 54 is a OTS-OPSM 66 then the OTS-OPSM 66a can be configured with a first holdover period and if the OPSM 54 is an OCH-OPSM 62, the OCH-OPSM 62 may be configured with a second holdover period.

In one embodiment, in a tailend node 38, applying holdover configurations for each protection layer (step 312) is performed by the processing module 74 by sending one or more control signal to each of the OTS-OPSM 66a-b, 70a-b and OCH-OPSM 62a-b. In one embodiment, a holdover, by a network element 22, for a holdover period, is not performed if another configured protection group is not found in the optical network 10. In this embodiment, a holdover configuration may exist at headend node 14 or at tailend node 18. If the network element 22 is one of the express node 150, the OA node 166, or the regen node 200 and an OPSM is provisioned, protection group detection will trigger configuration of a progressively increasing holdover period at the headend node 14 and the tailend node 18. Typically, the network element 22 will be include protection at the lowest layer, i.e., the OTS layer protection, so the OPSM 54 at the OTS layer will switch immediately to prevent higher level traffic failures, such as failures in SCHs carrying digital ODU tributaries.

In one embodiment, preventing digital circuit restoration in response to fast fault reporting (FFR) events (step 316) is performed within the network element 22 if another protection group is found at a higher recovery priority. For example, the OTS Layer may have a first recovery priority, the OCH Layer may have a second recovery priority, and the ODUk/j, e.g., 1+1 APS and YPG protection groups, (ODUk Layer) may have a third recovery priority. By prioritizing recovery of the protection groups in this way, the protection control process 300 of the optical network 10 ensures that the network element 22 attempts to recover an entire band first, then, if that fails, the network element 22 attempts to recover one or more group of optical carriers, and finally, if that fails, the network element 22 attempts to recover using the YPG or 1+1 APS. The organization of the OTS Layer, the OCH Layer, and the ODUk Layer may be referred to as an optical communication model. With respect to the present disclosure the OTS layer may have a first recovery priority, the OCH layer may have a second recovery priority, and the ODUk layer may have a third recovery priority. The first recovery priority is higher than the second recovery priority, meaning that the first recovery priority will be executed prior to the second recovery priority. Likewise, second recovery priority is higher than the third recovery priority, meaning that the second recovery priority will be executed prior to the third recovery priority.

In one embodiment, preventing digital circuit restoration in response to fast fault reporting (FFR) events (step 316) is performed by the processing module by soaking of the fault for a soak time. In this embodiment, soaking of the fault, i.e., waiting a predetermined period of time before responding to the fault via triggering FFR events is performed by the processing module. The soak time may be determined by first calculating a protection group holdover period at the next higher recovery priority summed with the optical switch settling time for the next higher recovery priority. A soaking timer may be configured by the processing module after detection of an OPSM protection group at the next higher recovery priority. In one embodiment, the soak time and OPSM protection group information may be communicated, along with Layer 0 Shared-Risk Link Group (SRLG) information from the optical layer to the digital layer by the processing module. The SRLG identifies L1 services going over the same L0 pipe, e.g., L1 services that would also fail if there is a L0 failure. Layer 1 signaling and/or routing utilizes SRLG information to diversely route protection entities across different L0 path.

To better illustrate how the protection control process 300 operates within the optical network 10, various configurations of the optical network 10 will be examined below as exemplary embodiments.

In a first exemplary embodiment, the optical network 10 is an optical network 10a and does not include the network element 22 between the headend node 14 and the tailend node 18. In this embodiment, protection group detection within each node, i.e., the headend node 14 and the tailend node 18, is performed by virtue of user provisioning for each node as described above. The user, in communication with the headend node 14 and the tailend node 18 may supply provisioning information to the processing module 74 of both the headend node 14 and the tailend node 18 and the provisioning information may be stored, by the processing module 74, into the memory 78. The provisioning information may, for each network element 22, the headend node 14 and the tailend node 18, include a soak time for one or more of the OTS Layer, the OCH Layer, and the ODUk Layer. In this embodiment, if an OCH Layer protection scheme is configured, the OCH Layer includes a first holdover period based on protection in the OTS Layer if an OTS Layer protection scheme is configured, and the ODUk Layer, if the ODUk Layer protection scheme is configured, has a second holdover period based on the first recovery priority in the OTS Layer and the second recovery priority in the OCH Layer. In other words, in this embodiment, when a failure is detected, such as by a photodiode 132 or by detecting OTSP bit 188, the processing module 74 will cause the OCH-OPSM 62a, i.e., the OCH Layer, to wait for the first holdover period, and if the OTS-OPSM 66a, i.e., the OTS Layer, does not switch from the fourth working path 26d to the fourth protection path 26e within the first holdover period, the processing module 74 will send a control signal to the OCH-OPSM 62a to cause the OCH-OPSM 62a, i.e., the OCH Layer, to implement its protection scheme and switch from the second working path 26b to the second protection path 34b. Finally, the processing module 74 will cause the ROADM 50, i.e., the ODUk Layer, to wait for the second holdover period, and if neither the OTS-OPSM 66a, OTS Layer, nor the OCH-OPSM 62a, OCH Layer, switch from their respective working path to their respective protection path within the second holdover period, the processing module 74 will cause the ROADM 50, i.e., the ODUk Layer, to implement its protection scheme and switch from the first working path 26a to the first protection path 34a. The second holdover period may be greater than the first holdover period.

In one embodiment the first holdover period is configured to be about the optical loss of signal (OLOS) soak time at the OTS-OPSM 66 combined with the optical switch 116 optical switch settling time of the OTS-OPSM 66. In one embodiment the second holdover period is configured to be the greater of the first holdover period and approximately the combination of the optical loss of signal (OLOS) soak time at the OCH-OPSM 62 combined with the optical switch 116 settling time of the OCH-OPSM 62. When no OCH Layer protection scheme is configured, the second holdover period is approximately equal to the first holdover period.

In one embodiment, each holdover period is only configured when a protection scheme with a higher recovery priority is identified. By configuring the soak time, any reporting of OLOS by an inline photodetector, e.g., photodiode 132, is delayed by the soak time in order to dampen the cadence. In a second exemplary embodiment, the optical network 10 is an optical network 10b wherein the network element 22 of the optical network 10 is the express node 150 and each terminal node, i.e., the headend node 14 and the tailend node 18, is a terminal node 38a as shown in FIG. 2B. In this embodiment, protection group detection within each node, i.e., the headend node 14 and the tailend node 18, is performed by virtue of user provisioning for each node as described above. Additionally, if a protection group is detected in the express node 150 at the OTS Layer, the protection detection is forwarded to the OCH-OPSM 62 of another node via an optical layer defect propagation (OLDP) protocol as described above and shown in FIG. 6. Further, in this embodiment, if an OCH Layer protection scheme is configured, the OCH Layer includes a first holdover period based on protection in the OTS Layer if an OTS Layer protection scheme is configured. The ODUk Layer, if the ODUk Layer protection scheme is configured, has a second holdover period based on the first recovery priority in the OTS Layer and the second recovery priority in the OCH Layer. In another embodiment, the protection detection information can be forwarded to the OCH-OPSM 62 of another node via any protocol that operates over the OSC.

In this embodiment, if a failure is detected in the express node 150, such as by one or more photodetector 134 of the OTS-OPSM 66, the processing module 125 of the OCH-OPSM 62, or the processing module 74, in the OCH Layer, having received the protection group detection from the OTSP bit 188 of the OLDP frame 174, will cause the OCH-OPSM 62a to wait for the first holdover period, and if the OTS-OPSM 66 of the express node 150, i.e., the OTS Layer, does not switch from the eleventh working path 26k to the eleventh protection path 34k within the first holdover period, the processing module 125 of the OCH-OPSM 62a, the OCH Layer, will implement its protection scheme and cause the optical switch 116 of the OCH-OPSM 62a of the terminal node 38a to switch from the ninth working path 26a to the ninth protection path 34i. Finally, the processing module 74 of the terminal node 38a at the ODUk Layer will wait for the second holdover period, and if neither the OTS Layer nor the OCH Layer switch from their respective working path to their respective protection path within the second holdover period, the processing module 74 of the terminal node 38a at the ODUk Layer will implement its protection scheme and cause the ROADM 50 to switch from the eighth working path 26h to the eighth protection path 34h. In one embodiment the first holdover period is configured to be about the optical loss of signal (OLOS) soak time at the OTS-OPSM 66 combined with the optical switch 116 optical switch settling time of the OTS-OPSM 66. In one embodiment the second holdover period is configured to be the greater of the first holdover period and approximately the combination of the optical loss of signal (OLOS) soak time at the OCH-OPSM 62 combined with the optical switch 116 optical switch settling time of the OCH-OPSM 62. When no OCH Layer protection scheme is configured, the second holdover period is approximately equal to the first holdover period. In one embodiment, each holdover period is only configured when a protection scheme with a higher recovery priority is identified.

In one embodiment, the ROADM 50 at the terminal node 38a will detect protection configuration information in either the OCH Layer 0 or the 1+1 APS Layer 1 layers at the terminal node 38a and generate the OLDP frame 174 by generating the OTSP bit 188 based on OTS-OTSP status, and any other bit information based on any OLDP layer defects and include the generated OLDP frame 174 into the OSC. In one embodiment, the OSC, and thus the OLDP frame 174 it transparently passed through the express node 150.

In a third exemplary embodiment, the optical network 10 is an optical network 10c wherein the network element 22 of the optical network 10 is the OA node 166 and each terminal node, i.e., the headend node 14 and the tailend node 18, is a terminal node 38a as shown in FIG. 2B. In this embodiment, protection group detection within each node, i.e., the headend node 14 and the tailend node 18, is performed by virtue of user provisioning for each node as described above. Additionally, protection group detected information forwarded to the OCH-OPSM 62 of another node via an optical layer defect propagation (OLDP) protocol. The protection group detection information is forwarded transparently through the OA node 166 at the OTS Layer, as described above and shown in FIG. 6. Further, in this embodiment, if an OCH Layer protection scheme is configured, the OCH Layer includes a first holdover period based on protection in the OTS Layer if an OTS Layer protection scheme is configured. The ODUk Layer, if the ODUk Layer protection scheme is configured, has a second holdover period based on the first recovery priority in the OTS Layer and the second recovery priority in the OCH Layer. In another embodiment, the protection detection information can be forwarded to the OCH-OPSM 62 of another node via any protocol that operates over the OSC.

In this embodiment, if a failure is detected in the OA node 166, such as by one or more photodetector 134 of the OTS-OPSM 66, the processing module 125 of the OCH-OPSM 62, or the processing module 74, in the OCH Layer, having received the protection group detection from the OTSP bit 188 of the OLDP frame 174, will cause the OCH-OPSM 62a to wait for the first holdover period, and if the OTS-OPSM 66 of the OA node 166, i.e., at the OTS Layer, does not switch from the eleventh working path 26k to the eleventh protection path 34k within the first holdover period, the processing module 125 of the OCH-OPSM 62a, at the OCH Layer, will implement its protection scheme and cause the optical switch 116 of the OCH-OPSM 62a of the terminal node 38a to switch from the ninth working path 26a to the ninth protection path 34i. Finally, the processing module 74 of the terminal node 38a at the ODUk Layer will wait for the second holdover period, and if neither the OTS Layer nor the OCH Layer switch from their respective working path to their respective protection path within the second holdover period, the processing module 74 of the terminal node 38a at the ODUk Layer will implement its protection scheme and cause the ROADM 50 to switch from the eighth working path 26h to the eighth protection path 34h.

In one embodiment the first holdover period is configured to be about the optical loss of signal (OLOS) soak time at the OTS-OPSM 66 of the OA node 166 combined with the optical switch 116 optical switch settling time of the OTS-OPSM 66 of the OA node 166. In one embodiment the second holdover period is configured to be the greater of the first holdover period and approximately the combination of the optical loss of signal (OLOS) soak time at the OCH-OPSM 62 of the terminal node 38a combined with the optical switch 116 optical switch settling time of the OCH-OPSM 62 of the terminal node 38a. When no OCH Layer protection scheme is configured, the second holdover period is approximately equal to the first holdover period. In one embodiment, each holdover period is only configured when a protection scheme with a higher recovery priority is identified.

In one embodiment, the ROADM 50 at the terminal node 38a will detect protection configuration information in either the OCH Layer 0 or the 1+1 APS Layer 1 layers at the terminal node 38a and generate the OLDP frame 174 by generating the OTSP bit 188 based on OMS-OTSP status or SCH-OTSP status, and any other bit information based on any OLDP layer defects and include the generated OLDP frame 174 into the OSC. In one embodiment, the OSC, and thus the OLDP frame 174 it transparently passed through the express node 150. In one embodiment, any intermediate OEO node will detect OTS-OTSP and cascade it as OCH-OTSPi (where i=1, n) as well as pass along the OTSPi with any other OLDP Layer Defects downstream via the OSC.

In a fourth exemplary embodiment, the optical network 10 is an optical network 10d wherein the network element 22 of the optical network 10 is the regen node 200 and each terminal node, i.e., the headend node 14 and the tailend node 18, is a terminal node 38a as shown in FIG. 2B. In this embodiment, protection group detection within each node, i.e., the headend node 14 and the tailend node 18, is performed by virtue of user provisioning for each node as described above. Additionally, protection group detected information forwarded to the OCH-OPSM 62 of another node via the OLDP protocol. The protection group detection information is forwarded through the regen node 200 as described above. In one embodiment, the regen node 200 does not include the OTS-OPSM 66. Further, in this embodiment, if an OCH Layer protection scheme is configured, the OCH Layer includes a first holdover period based on protection in the OTS Layer if an OTS Layer protection scheme is configured. The ODUk Layer, if the ODUk Layer protection scheme is configured, has a second holdover period based on the first recovery priority in the OTS Layer and the second recovery priority in the OCH Layer. In another embodiment, the protection detection information can be forwarded to the OCH-OPSM 62 of another node via any protocol that operates over the OSC.

In this embodiment, if a failure is detected in the regen node 200, such as by one or more photodetector 134 of the OTS-OPSM 66, the processing module 125 of the OCH-OPSM 62, having received the protection group detection from the OTSP bit 188 of the OLDP frame 174, will cause the OCH-OPSM 62a to wait for the first holdover period, and if the OTS-OPSM 66 of the regen node 200 does not switch from the eleventh working path 26k to the eleventh protection path 34k within the first holdover period, the processing module 125 of the OCH-OPSM 62a, at the OCH Layer, will implement its protection scheme and cause the optical switch 116 of the OCH-OPSM 62a of the terminal node 38a to switch from the ninth working path 26a to the ninth protection path 34i. Finally, the processing module 74 of the terminal node 38a at the ODUk Layer will wait for the second holdover period, and if neither the OTS Layer nor the OCH Layer switch from their respective working path to their respective protection path within the second holdover period, the processing module 74 of the terminal node 38a at the ODUk Layer will implement its protection scheme and cause the ROADM 50 to switch from the eighth working path 26h to the eighth protection path 34h.

In one embodiment the first holdover period is configured to be about the optical loss of signal (OLOS) soak time at the OTS-OPSM 66 of the regen node 200 combined with the optical switch 116 optical switch settling time of the OTS-OPSM 66 of the regen node 200. In one embodiment the second holdover period is configured to be the greater of the first holdover period and approximately the combination of the optical loss of signal (OLOS) soak time at the OCH-OPSM 62 of the terminal node 38a combined with the optical switch 116 optical switch settling time of the OCH-OPSM 62 of the terminal node 38a. When no OCH Layer protection scheme is configured, the second holdover period is approximately equal to the first holdover period. In one embodiment, each holdover period is only configured when a protection scheme with a higher recovery priority is identified.

In one embodiment, the regen node 200 does not include the OTS-OPSM 66 unless span protection is required, in which case the regen node 200 will include the OTS-OPMS 66 as shown in FIG. 7. In this embodiment, if OTSP is configured in either the headend node 14 or the regen node 200, then OTSP should be configured in the tailend node 18 as well. In this case, the OTSP bit 188 will be set in the OLDP frame 174 and included on the OSC in both the upstream direction, i.e., towards the headend node 14, and downstream direction, i.e., towards the tailend node 18. As described above in reference to FIG. 7, the OLDP frame 174 in the OSC is transmitted through the regen node 200, and as described in U.S. patent application Ser. No. 16/998,159 entitled "SD-FEC DEFECT PROPAGATION ACROSS REGENERATION NODES IN SUPPORT OF SINGLE AND MULTI-CARRIER SUPER CHANNEL PROTECTION IN ROADM NETWORKS" filed on Aug. 20, 2020, the entire contents of which as hereby incorporated by reference.

In a fifth exemplary embodiment, the optical network 10 is an optical network 10e wherein the network element 22 of the optical network 10 includes an express node 150, an OA node 166 and a regen node 200, and each terminal node, i.e., the headend node 14 and the tailend node 18, is a terminal node 38a as shown in FIG. 2B. In this embodiment, protection group detection within each node, i.e., the headend node 14 and the tailend node 18, is performed by virtue of user provisioning for each node as described above. In this embodiment, protection detection spanning across the express node 150 will trigger setting the OCH-OTSP bit 188 in the OLDP frame 174 in both the upstream and downstream direction from the express node 150. Similarly, protection detection spanning across the OA node 166 will trigger setting the OTS-OTSP bit 188 in the OLDP frame 174 in both the upstream and downstream direction from the OA node 166, and the OA node 166 will transparently pass along any OTS-OTSP bit 188. The ROADM 50 at each terminal node 38a will detect the OTS-OTSP status and the OCH-OTSP status to determine the first holdover period and the second holdover period for the terminal node 38a. The regen node 200 will detect any OTS-OTSP status and include the OTS-OTSP status as OCH-OTSPi (where i=1, n) and pass along the OCH-OTSPi, and any other OLDP layer defects, such as any other OCH-OTSP status received, as part of the OLDP frame 174 in the OSC in the downstream direction.

Figure 9:
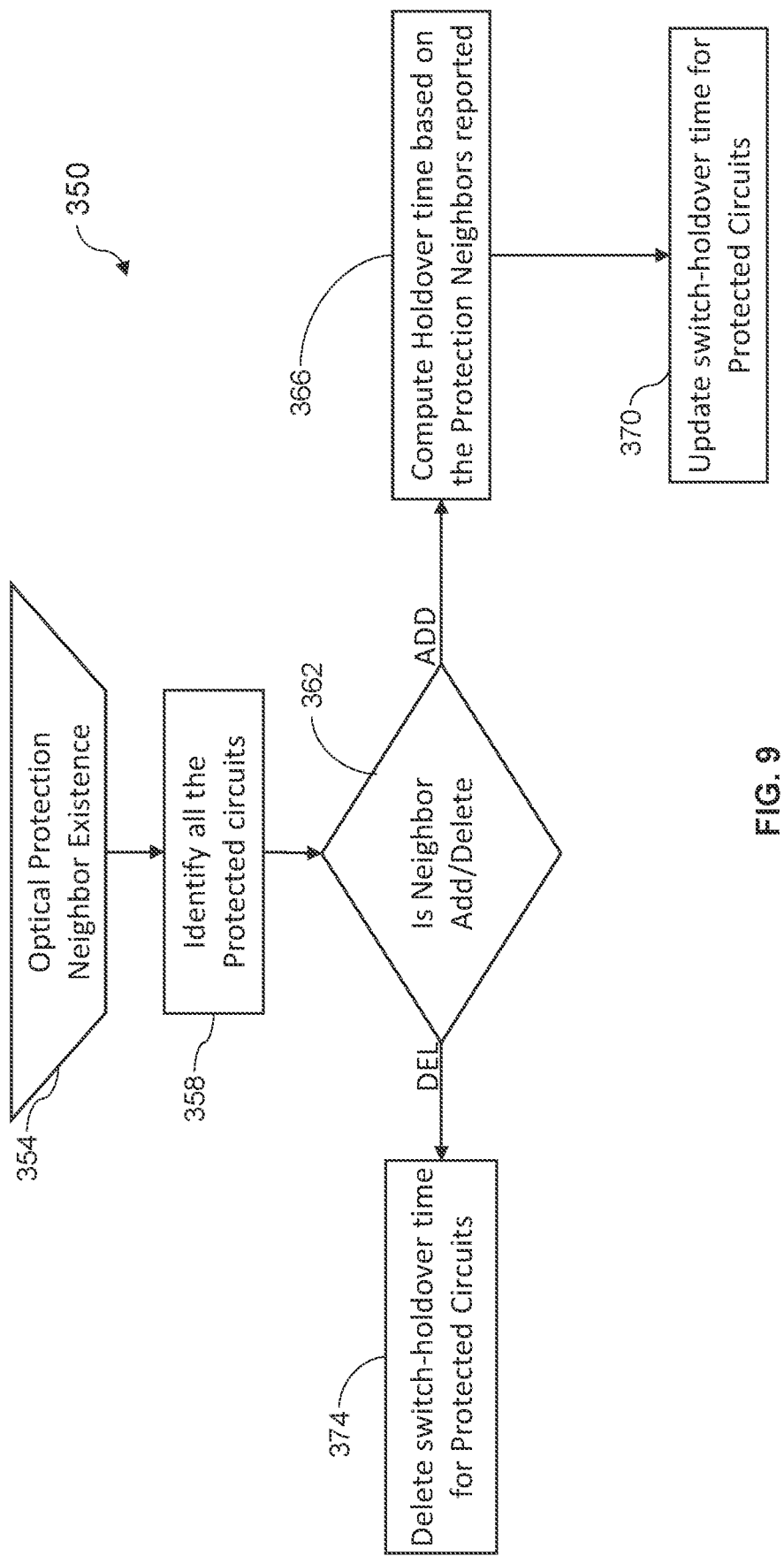
FIG. 9 is a process flow diagram of an exemplary embodiment of a holdover timer configuration process in accordance with the present disclosure.

Referring now to FIG. 9, shown therein is an exemplary embodiment of a holdover timer configuration process 350. Generally, the holdover timer configuration process 350 progressively increases the holdover period for different protection entities in order to achieve the desired effect of preventing multiple switchovers in response to a common, or single, network failure condition. The process 350 generally comprises the steps of: determining an optical protection neighbor existence (step 354); identifying each channel protected by a protection scheme (step 358); if the optical protection neighbor type is an ADD operation (decision 362), then continue to computing holdover period (Step 366) and updating switch-holdover period for each protected circuit (step 370), however, if the optical protection neighbor type is a DEL operation (decision 362), then continue to deleting switch-holdover period for protected circuits (step 374).

In one embodiment, determining an optical protection neighbor type (step 354) includes determining, by a processing module of a particular node, whether an optical protection neighbor exists, that is, whether an upstream or downstream node implements a protection group scheme. For example, if the particular node is a terminal node, e.g., the headend node 14, the processing module 74 will determine whether a downstream node implements a protection scheme. Similarly, if the particular node is a network element 22, the processing module, such as the processing module 155 of the express node 150 or OA node 166 or the processing module 212 of the regen node 200, will determine whether a downstream node, e.g., the tailend node 18 or an upstream node, e.g., the headend node 14, implements a protection group scheme. In one embodiment, determining an optical protection neighbor existence may include accessing the memory by the processing module. The optical protection neighbor type may include one or more of the ODUk Layer, the OCH Layer, and the OTS Layer.

If an optical protection neighbor exists, the holdover timer configuration process 350 will continue with step 358. In one embodiment, identifying each channel protected by a protection group scheme (step 358) may include identifying all channels, either digital or optical, that pass through one or more protection neighbor, and are therefore protected, by the protection group scheme of each protection neighbor.

Once all protected channels are identified, the holdover timer configuration process 350 continues to decision 362, determining whether the optical protection neighbor has an ADD or DEL operation. Operations on optical protection entities are generically referred to as either ADD or DEL, which would lead, respectively, to creation or deletion of a protection group entity.

If, at decision 362, it is determined that the optical protection neighbor has an ADD operation, then the holdover timer configuration process 350 will continue to compute the holdover period (Step 366). Computing the holdover period may be accomplished as described above in more detail. For example, in one embodiment, computing the holdover period may include calculating a first holdover period for the OCH Layer based on a soak time combined with an optical switch settling time at the OTS Layer and calculating a second holdover period for the ODUk Layer based on a soak time combined with an optical switch settling time at the OCH layer and the first holdover period.

Once computing the holdover period (step 366) has completed, the holdover timer configuration process 350 will continue to update a switch-holdover period for each protected circuit (step 370). In one embodiment, updating switch-holdover period for each protected circuit (step 370) includes updating, by the processing module 74 an ODUk holdover period to the second holdover period and updating the OCH holdover period to the first holdover period. In one embodiment, the processing module 74 sends a first control signal to the ROADM 50 to update the ODUk holdover period and the processing module 74 sends a second control signal to the processing module 125 of the OCH-OPSM 62 to update the OCH holdover period. Further, in one embodiment, the processing module 125 of the OCH-OPSM 62 may store the OCH holdover period, i.e., the first holdover period, in the memory 126.

In an alternative embodiment, the processing module 125 may compute the first holdover period, update the OCH holdover period by storing the computed first holdover period in the memory 126, and transmit the computed first holdover period to the processing module 74.

If, at decision 362, it is determined that the optical protection neighbor has an DEL operation, then the holdover timer configuration process 350 will continue to deleting switch-holdover period for protected circuits (step 374). In one embodiment, deleting a switch-holdover period (step 374) may include deleting, by the processing module 74, the ODUk holdover period stored in the memory 78 and/or may include deleting, by the processing module 125 of the OCH-OPSM 62 the OCH holdover period stored in the memory 126. In one embodiment, if OCH holdover period is deleted, but the ODUk holdover period is not deleted, then the ODUk holdover period may be re-computed, such as described in step 366 and the ODUk holdover period may be updated, such as described in step 370.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A terminal node, comprising:
a first optical protection switching module including a first line port connected to a first working path, a second line port connected to a first protection path, an system port, and a first processor monitoring optical signals received by the first line port to determine a first failure in the first working path at a first layer within an optical communication model, the first optical protection switching module including a first optical switch coupled to the first line port to receive first optical signals from the first working path and the second line port to receive second optical signals from the first protection path for selectively switching optical signals from the first line port or the second line port to the system port;

a second optical protection switching module having a third line port receiving optical signals from the system port of the first optical protection switching module, and a second processor monitoring the optical signals received by the third line port to determine a second failure in the first working path at a second layer within the optical communication model, the second optical protection switching module having a second optical switch controlled by the second processor; and wherein the first processor and the second processor coordinate switching of the first optical switch and the second optical switch upon detection of the first failure by the first processor, or the detection of the second failure by the second processor.

2. The terminal node of claim 1, wherein the second processor is configured with a holdover period such that upon detection of the second failure, the second processor switches the second optical switch after confirming the presence of the second failure after the passage of the holdover period.

3. The terminal node of claim 2, wherein first optical switch has a first optical switch settling time being a time period for the first optical switch to switch from the first line port to the second line port, and wherein the holdover period is a predetermined period of time greater than the first optical switch settling time.

4. The terminal node of claim 1, wherein the first layer is a physical layer, and the second layer is an optical layer.

5. The terminal node of claim 1, wherein the first failure is an optical loss of signal.

6. The terminal node of claim 1, wherein the second failure is a loss of frame.

7. An optical network, comprising:
an optical fiber having a first end and a second end;
a first node comprising a first optical protection switching module including a first line port connected to a first working path, a second line port connected to a first protection path, an system port supplying optical signals to the first end of the optical fiber, and a first processor monitoring optical signals received by the first line port to determine a first failure in the first working path at a first layer within an optical communication model, the first optical protection switching module including a first optical switch coupled to the first line port to receive first optical signals from the first working path and the second line port to receive second optical signals from the first protection path for selectively switching optical signals from the first line port or the second line port to the system port;

a second node including a second optical protection switching module having a third line port receiving optical signals from the system port of the first optical protection switching module from the second end of the optical fiber, and a second processor monitoring the optical signals received by the third line port to determine a second failure in the first working path at a second layer within the optical communication model, the second optical protection switching module having a second optical switch controlled by the second processor; and wherein the first processor and the second processor coordinate switching of the first optical switch and the second optical switch upon detection of the first failure by the first processor, or the detection of the second failure by the second processor.

8. The optical network of claim 7, wherein the second processor is configured with a holdover period such that upon detection of the second failure, the second processor switches the second optical switch after confirming the presence of the second failure after the passage of the holdover period.

9. The optical network of claim 7, wherein the first processor coordinates switching of the second optical switch with the second processor by causing the first node to include an OTSP status with the optical signal and the second processor configures a holdover period based at least in part on the OTSP status such that, upon detection of the second failure, the second processor switches the second optical switch after confirming the presence of the second failure after the passage of the holdover period.

10. The optical network of claim 9, wherein first optical switch has a first optical switch settling time being a time period for the first optical switch to switch from the first line port to the second line port, and wherein the holdover period is a predetermined period of time greater than the first optical switch settling time.

11. The optical network of claim 9, wherein the second processor causes the first node to include the OTSP status with the optical signal by causing an optical supervisory channel to include the OTSP status.

12. The optical network of claim 7, wherein the first failure is an optical loss of signal.

13. The optical network of claim 7, wherein the second failure is a loss of frame.

14. A node, comprising:
a first optical protection switching module including a first line port connected to a first working path, a second line port connected to a first protection path, a system port, and a first processor monitoring optical signals received by the first line port to determine a first failure in the first working path at a first layer within an optical communication model, the first optical protection switching module including a first optical switch coupled to the first line port to receive first optical signals from the first working path and the second line port to receive second optical signals from the first protection path for selectively switching optical signals from the first line port or the second line port to the system port;

a second optical protection switching module having a third line port receiving optical signals from the system port of the first optical protection switching module, and a second processor monitoring the optical signals received by the third line port to determine a second failure in the first working path at a second layer within the optical communication model, the second optical protection switching module having a second optical switch controlled by the second processor; and wherein the first processor and the second processor are preconfigured to coordinate switching of the first optical switch and the second optical switch upon detection of the first failure by the first processor, or the detection of the second failure by the second processor.

15. The node of claim 14, wherein the second processor is configured with a holdover period such that upon detection of the second failure, the second processor switches the second optical switch after confirming the presence of the second failure after the passage of the holdover period.

16. The node of claim 15, wherein first optical switch has a first optical switch settling time being a time period for the first optical switch to switch from the first line port to the second line port, and wherein the holdover period is a predetermined period of time greater than the first optical switch settling time.

17. The node of claim 14, wherein the first layer is a physical layer, and the second layer is an optical layer.

18. The node of claim 14, wherein the first failure is an optical loss of signal.

19. The node of claim 14, wherein the second failure is a loss of frame.

* * * * *